United States Patent
Bujalski et al.

(10) Patent No.: US 12,042,802 B2
(45) Date of Patent: Jul. 23, 2024

(54) METHOD FOR MONITORING FLOW IN CENTRIFUGAL SEPARATOR

(71) Applicant: YARA INTERNATIONAL ASA, Oslo (NO)

(72) Inventors: Jakub Bujalski, Porsgrunn (NO); Stine Karlsen, Sandefjord (NO); Lars-Erik Andersen, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 263 days.

(21) Appl. No.: 17/260,928

(22) PCT Filed: Sep. 5, 2019

(86) PCT No.: PCT/EP2019/073654
§ 371 (c)(1),
(2) Date: Jan. 15, 2021

(87) PCT Pub. No.: WO2020/049080
PCT Pub. Date: Mar. 12, 2020

(65) Prior Publication Data
US 2021/0268521 A1 Sep. 2, 2021

(30) Foreign Application Priority Data
Sep. 5, 2018 (EP) .................................. 18192740

(51) Int. Cl.
*B01D 19/00* (2006.01)
*B04C 5/00* (2006.01)
(Continued)

(52) U.S. Cl.
CPC .......... *B04C 11/00* (2013.01); *B01D 19/0057* (2013.01); *B01D 19/0063* (2013.01);
(Continued)

(58) Field of Classification Search
CPC .. B04C 11/00; B04C 5/00; B04C 3/00; B01D 19/0057; B01D 19/0063; G01F 23/288
See application file for complete search history.

(56) References Cited

U.S. PATENT DOCUMENTS

| | | | |
|---|---|---|---|
| 4,076,507 A | 2/1978 | Hauberg | |
| 4,876,016 A * | 10/1989 | Young | B04C 11/00 210/512.1 |

(Continued)

FOREIGN PATENT DOCUMENTS

| | | | |
|---|---|---|---|
| CN | 103028839 A | * | 4/2013 |
| CN | 204785578 | | 11/2015 |

(Continued)

OTHER PUBLICATIONS

Chinese Office Action (with English translation) for App. No. CN201880069654.6, dated Nov. 25, 2021, 22 pages.

(Continued)

*Primary Examiner* — Dung H Bui
(74) *Attorney, Agent, or Firm* — Dilworth IP, LLC (57) ABSTRACT

A centrifugal separator for industrial separation of a liquid-gas mixture, including a centrifugal separator body having a centrifugal separator body wall, the centrifugal separator body including a cylindrical section and a conical section, a gas outlet positioned at the top end of the centrifugal separator body and a liquid outlet positioned at the bottom end of the centrifugal separator body, the centrifugal separator body further including a liquid-gas mixture inlet orifice, positioned in the cylindrical section of the centrifugal separator body, and a detector for detecting the thickness of the liquid on the centrifugal separator body wall, wherein the detector is positioned in the cylindrical section. A method for monitoring the flow through such a centrifugal separator.

19 Claims, 4 Drawing Sheets

(51) Int. Cl.
  *B04C 11/00* (2006.01)
  *G01F 23/288* (2006.01)
  *B04C 3/00* (2006.01)
(52) U.S. Cl.
  CPC .............. *B04C 5/00* (2013.01); *G01F 23/288* (2013.01); *B04C 3/00* (2013.01)

(56) References Cited

U.S. PATENT DOCUMENTS

| | | | | |
|---|---|---|---|---|
| 6,129,775 | A | 10/2000 | Conrad | |
| 6,686,752 | B1* | 2/2004 | Heumann | B01D 45/12 55/435 |
| 2005/0021246 | A1* | 1/2005 | Olson | G01N 3/56 702/34 |
| 2009/0020019 | A1 | 8/2009 | Meinander et al. | |
| 2009/0201975 | A1* | 8/2009 | Meinander | D21D 5/26 494/10 |
| 2013/0188769 | A1* | 7/2013 | Tsuchimoto | G01N 23/046 378/4 |
| 2017/0128906 | A1* | 5/2017 | Louis | A61L 2/14 |

FOREIGN PATENT DOCUMENTS

| | | | |
|---|---|---|---|
| CN | 208082702 U | * | 11/2018 |
| RU | 2125491 C1 | | 1/1999 |
| RU | 2182045 C2 | | 5/2002 |
| WO | 2005003726 A2 | | 1/2005 |
| WO | 2008045253 A2 | | 4/2008 |
| WO | 2020144394 | | 7/2020 |

OTHER PUBLICATIONS

Ninahuanca et al., "Characterization of the liquid film flow in a centrifugal separator", AIChE Journal, Jun. 2016, vol. 32, No. 6, pp. 2213-2226.
Colombian Office Action (including English translation) issued in App No. NC2021/0003666, dated Jan. 18, 2022, 22 pages.
European Search Report for EP18192740.1; Applicant: Yara International ASA, dated Feb. 25, 2019, 9 pages.
PCT International Search Report and Written Opinion for PCT/EP2019/073654; Applicant: Yara International ASA, dated Nov. 12, 2019, 10 pages.

* cited by examiner

METHOD FOR MONITORING FLOW IN CENTRIFUGAL SEPARATOR

FIELD OF THE INVENTION

The invention relates to a centrifugal separator, in particular a centrifugal separator for the separation of a gas and liquid mixture. The centrifugal separator of the invention comprises a monitoring system, suitable to monitor the flow through the centrifugal separator and suitable to detect blockages in the flow and change in the flow pattern inside the centrifugal separator.

BACKGROUND OF THE INVENTION

Centrifugal separators such as hydrocyclones are typically used to separate gas from liquid in batch processes and especially in continuous flow processes.

Figure 1A:
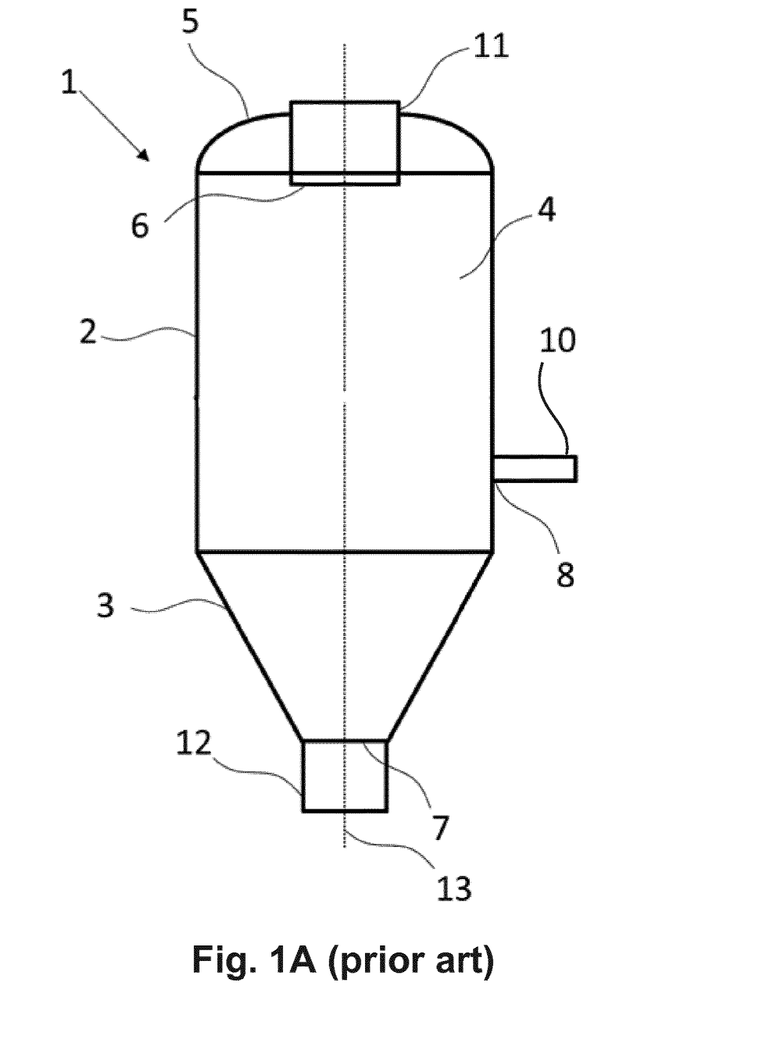
FIG. 1A represents a prior art centrifugal separator.

FIG. 1A provides a schematic representation of a centrifugal separator of the prior art as known in the state of the art separation technology, indicating the elements of a typical centrifugal separator. The centrifugal separator comprises a cylindrical section 2 and a conical section 3, together encasing an centrifugal separator cavity 4, which is symmetrical around a central axis 13. The cylindrical section 2 is closed off at the upper side with a cover 5, where through a gas outlet 6 is placed, connected to a gas outlet pipe 11. At the bottom of the conical section 3 a liquid outlet 7 is present, connected to a liquid outlet pipe 12. A liquid-gas mixture inlet orifice 8 is in fluidly connection with the centrifugal separator cavity 4 through the cylindrical section 2. The liquid-gas mixture inlet orifice 8 is connected to inlet pipe 10. Often, a flow monitoring device is located at the liquid outlet.

Centrifugal separators often form part of complex industrial installations with many other components. Therefore, it is often necessary to monitor the flow through the centrifugal separator, or to monitor the efficiency of gas-liquid separation, as this can have consequences upstream and downstream from the centrifugal separator. Also, gas-liquid separators known in the prior arttypically suffer from a variety of deficiencies when operating under high liquid loading. It is the objective of a centrifugal separator to rapidly separate the product gas from the liquid phase.

Therefore, there is a demand towards centrifugal separators where highly responsive flow measurement can be carried out. Centrifugal separators should be able to work at the peak or above peak of their design capacity, while still maintaining optimal functionality under an operator's control. The operator should be able to monitor the centrifugal separator operation in an accurate manner and detect problems quickly while being a minimal health risk for bystanders.

SUMMARY OF THE INVENTION

It is accordingly one of the objects of the present invention to overcome or ameliorate one or more of the aforementioned disadvantages present in the market, or to meet any of the demands that are present in the market.

It has now been surprisingly found that one or more of these objects can be obtained by providing a centrifugal separator wherein means of detecting the thickness of the liquid layer inside the centrifugal separator are positioned along the cylindrical section of the centrifugal separator or positioned above the liquid-gas mixture inlet orifice of the centrifugal separator.

The invention particularly relates to a centrifugal separator for industrial separation of a liquid-gas mixture, comprising a centrifugal separator body having a centrifugal separator body wall, the centrifugal separator body comprising a cylindrical section and a conical section, a gas outlet positioned at the top end of the centrifugal separator body and a liquid outlet positioned at the bottom end of the centrifugal separator body, a liquid-gas mixture inlet orifice (8), in particular positioned in the cylindrical section (2) of the centrifugal separator body; characterized in that the centrifugal separator further comprises means for detecting the thickness of the liquid on the centrifugal separator body wall, wherein the means for detecting the thickness of the liquid are positioned in the cylindrical section (2). In some embodiments, the means for detecting is positioned at the same height or above the position of the liquid-gas mixture inlet orifice.

In some embodiments, the detection means is positioned in the upper half of the cylindrical section.

In some embodiments, the detection means is positioned between a height of at least 50% to at most 67% of the height of the cylindrical section.

In some embodiments, the liquid-gas mixture inlet orifice is provided in the bottom half of the cylindrical section.

In some embodiments, the ratio between the height of the position of the means for detecting in the cylindrical section and the height of the liquid-gas mixture inlet orifice in the cylindrical section is at least 1.0/1.0, in particular at least 1.2/1.0, more in particular at least 1.3/1.0, even more in particular at least 1.4/1.0 and most in particular at least 1.6/1.0.

In some embodiments, the means for detecting comprises a wave source and a wave detector, in particular an electromagnetic wave source and an electromagnetic wave detector.

In some embodiments, the wave source emits gamma-rays.

In some embodiments, the wave source and wave detector are positioned at the same height. In a second aspect, the invention relates to the use of a centrifugal separator according to an embodiment of the first aspect of the invention, as separating means of a gas and liquid mixture, wherein the liquid comprises at least one nitrate salt.

In a third aspect, the invention relates to the use of a centrifugal separator according to an embodiment of the first aspect of the invention, as separating means of a gas and liquid mixture, wherein the liquid has a salt concentration of at least 0 to at most 1600 g/l.

In a fourth aspect, the invention relates to the use of a centrifugal separator according to an embodiment of the first aspect of the invention, as separating means of a gas and liquid mixture, wherein the liquid has density of at least 10 kg/m$^3$ to at most 2000 kg/m$^3$.

In a fifth aspect, the invention relates to a method for detecting the thickness of a liquid layer of a liquid moving along a substantially symmetrical spiral path within a centrifugal separator, the centrifugal separator comprising a centrifugal separator body having a centrifugal separator body wall, the centrifugal separator body comprising a cylindrical section and a conical section, a gas outlet positioned at the top end of the centrifugal separator body, a liquid-gas mixture inlet orifice, in particular positioned in the cylindrical section of the centrifugal separator body; wherein the centrifugal separator further comprises means for detecting the thickness of the liquid on the centrifugal separator body wall positioned in the cylindrical section, wherein the method comprises the steps of:

providing a flow of liquid moving along a substantially symmetrical spiral path within the centrifugal separator;

monitoring the output signal of the means for detecting; converting the output signal towards a liquid thickness.

In some embodiments of the method, the centrifugal separator is a centrifugal separator according to an embodiment of the first aspect of the invention.

In a sixth aspect, the invention relates to use of detection means for measuring the thickness of a liquid, positioned along the cylindrical section of a centrifugal separator, as a flow monitoring device in the centrifugal separator.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. (Preferred) embodiments of one aspect of the invention are also (preferred) embodiments of all other aspects of the invention.

DETAILED DESCRIPTION OF THE INVENTION

When describing the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As used in the specification and the appended claims, the singular forms "a", "an," and "the" include plural referents unless the context clearly dictates otherwise. By way of example, "a gamma-ray" means one gamma-ray or more than one gamma-ray.

Unless otherwise specified, a diameter is an internal diameter.

Unless defined otherwise, all technical and scientific terms used herein have the same meaning as is commonly understood by one of skill in the art. All publications referenced herein are incorporated by reference thereto.

Throughout this application, the term 'about' is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

It has now been surprisingly found that information on flow can be obtained by centrifugal separators wherein means of detecting the thickness of the liquid layer inside the centrifugal separator are positioned along the cylindrical section of the centrifugal separator or positioned above the liquid-gas mixture inlet orifice of the centrifugal separator.

In a first embodiment, described herein is a centrifugal separator for industrial separation of a liquid-gas mixture, comprising a centrifugal separator body having a centrifugal separator body wall, the centrifugal separator body comprising a cylindrical section and a conical section, a gas outlet positioned at the top end of the centrifugal separator body and a liquid outlet positioned at the bottom end of the centrifugal separator body; characterized therein that the centrifugal separator body further comprises a liquid-gas mixture inlet orifice, in particular positioned in the cylindrical section of the centrifugal separator body, and means for detecting the thickness of the liquid on the centrifugal separator body wall; wherein the means for detecting is positioned in the cylindrical section.

It has been observed that centrifugal separators with detecting means positioned according to the invention are more responsive to changes in flow, allowing for a greater operational flexibility than when the detecting means are located in the bottom conical section. This allows for better regulating of the flow through the centrifugal separator, or better regulating in processes upstream and/or downstream of the centrifugal separator. Compared to centrifugal separators where the means for detecting are positioned at the bottom of the centrifugal separator in the conical section, it has been found that especially when working at high capacities, the output signal of the means of detecting can lose the response or even disappear completely, while with the centrifugal separator according to the invention, it is observed that far larger flows can be send through the centrifugal separator before the signal of the detecting means deteriorates or disappears. It has been observed that the centrifugal separator according to the invention may provide information on the flow over a far larger flow rate range that would be achieved with prior art. Therefore, the centrifugal separator can work at a higher capacity and still provide information of the flow. This may prevent that the flow through the centrifugal separator is the speed limiting factor in an installation. In the prior art, it could have been possible that the flow through the chemical plant or the installation was artificial limited to a flow where there was still a signal detected by the detecting means, with the invention, signal is still detected by much higher flow, so that the chemical plant or installation can operate at higher flows, making the chemical plant or installation more profitable.

The liquid layer might move upwards in the separator, creeping towards the gas outlet. Once the liquid layer has reached the gas outlet, liquid may escape the centrifugal separator via the gas outlet, causing a drastic fall in separation sufficiency. Due to the position of the detecting means in the invention, such liquid creep can be detected, and conditions can be changed to stop the creep of the liquid in the centrifugal separator. The centrifugal separator works by maintaining a vortex of liquid on the inner wall of the separator. When this vortex breaks or disappears, the separation efficiency reduces drastically. The position of the detecting means in the invention allows for detection such a break in the vortex, e.g. when no liquid is detected on the wall. Especially when the means for detecting are positioned above the inlet, the only way there can be liquid detected on the wall is when there is a vortex present. When the detecting means are positioned in the bottom conical section, liquid running straight from the inlet over the wall to the liquid outlet, without going through a vortex motion, may be detected by detecting means positioned there. For detecting means positioned in the bottom conical section, it is difficult or even impossible to distinguish between a flow of liquid over the wall or a flow caused by a vortex of liquid on the wall.

The term "cylindrical section" as used herein refers to the section of centrifugal separator body, where the internal diameter is the same along the central axis of the centrifugal separator.

The term "centrifugal separator" refers to a separator, which uses centrifugal forces to separate materials, in particular gas and liquid with or without solids, or gas and solids or liquids and solids, from each other. In some embodiments, the centrifugal separator is a cyclone, more in particular a hydrocyclone.

In some embodiments, the centrifugal separator is a hydrocyclone for the separation of gas and liquid from each other.

The term "liquid-gas mixture" refers to a combination of gas and liquid, this combination can be in any physical form, such as droplets of liquid in the gas, bubbles of gas in the liquid or flow of liquid and a flow of gas through the same vessel or pipe. The liquid in the liquid-gas mixture may comprise solids, for example solids suspended in the liquid.

The term "centrifugal separator body" refers to the vessel housing the centrifugal separator cavity. The term "centrifugal separator body wall" refers to a part of the centrifugal separator body and is the physical barrier encasing the centrifugal separator cavity.

The term "gas outlet" refers to an orifice in the centrifugal separator body or centrifugal separator body wall suitable for gas to leave the centrifugal separator. In particular, the gas outlet is positioned at the top end of the centrifugal separator body.

The term "liquid outlet" refers to an orifice in the centrifugal separator body or centrifugal separator body wall suitable for liquid to leave the centrifugal separator. In particular, the liquid outlet is positioned at the bottom end of the centrifugal separator body.

The term "liquid-gas mixture inlet orifice" refers to the opening where though the liquid-gas mixture enters the centrifugal separator.

The term "means for detecting the thickness of the liquid on the centrifugal separator body wall" hereafter often shortened to "means for detecting" refer to a measuring device capable to determine the thickness of the liquid on the centrifugal separator body wall.

Whenever referred to the position of an inlet or an outlet, it is the middle point of the intersection between the inlet or outlet and the conical section, cylindrical section or cover with the inlet or the outlet that determines the position of the inlet of outlet. For example when an inlet is formed by a tube with a diameter of 10 cm halfway the cylindrical section, the position of the inlet is at a height of 50% of the height of the cylindrical section i.e. 5 cm.

Although the detection means may comprise several other elements, unless otherwise specified, the position of the detection means the position of the detector, in particular the middle point of the detector window where trough waves enter the detector to be detected.

In particular, the centrifugal separator is intended to work in a vertical position, meaning the central axis of the cylindrical section is positioned vertically. In this vertical position, the conical section is placed below the cylindrical section. When referred to "up" and "down" or "top" or "bottom", this vertical orientation is the reference, even when the centrifugal separator is not is the vertical orientation, "up" and "down" or "top" or "bottom" still have the same relative meaning.

The position on or in the cylindrical section may be represent by a percentage of the height of the cylindrical section, wherein a height of 0% of the cylindrical section corresponds to the seam-line between the cylindrical section and the conical section and a height of 100% of the cylindrical section corresponds to height where the diameter starts to decrease.

The term "conical section" refers to the section of centrifugal separator, where the internal diameter decreases along the central axis of the centrifugal separator and this, in particular, in a linear relation between the diameter and the distance along the central axis. The conical section may also be a truncated conical section or frustoconical.

In some embodiments, the conical section gradually decreases in diameter, thereby, increasing the centrifugal forces imparted on the gas and liquid mixture in order to facilitate separation. In some embodiments, the centrifugal separator body comprises an elongated centrifugal separator cavity defined by the centrifugal separator body wall, the centrifugal separator cavity having an overflow end, an underflow end, and a substantially centrally located axis extending between the underflow end and the overflow end; the centrifugal separator cavity having a substantially circular cross section throughout at least part of the axial length; the gas outlet (6) being positioned proximal to the overflow end and the liquid outlet (7) being positioned proximal to the underflow end. In some embodiments, the gradual decrease in the conical section diameter further promotes conservation of fluid momentum and separation toward the underflow end.

In some embodiments, a gas outlet is positioned and constructed to provide for evacuation of gas.

In some embodiments, at least one liquid outlet is positioned proximal to the underflow end and constructed to provide for evacuation of liquid. In some embodiments, the centrifugal separator cavity terminates at the underflow end.

In some embodiments, the centrifugal separator cavity of the centrifugal separator is symmetrical, apart from inlets and outlets, around a central axis. The central axis, is in particular also the central axis of the cylindrical section and the conical section. Unless otherwise indicated, length and height are defined according to this central axis.

The position on or in the conical section may be represent by a percentage of the height of the conical section, wherein a height of 0% of the conical section corresponds to position of the liquid outlet and a height of 100% of the conical section corresponds to the seam line between the cylindrical section and the conical section.

In some embodiments, the means for detecting is positioned at the same height or above the position of the liquid-gas mixture inlet orifice.

In some embodiments, the means for detecting is positioned at the same height or above the position of the liquid-gas mixture inlet orifice but below the position of the gas outlet.

In some embodiments, the at least one inlet orifice positioned and constructed to communicate a gas and liquid mixture into the centrifugal separator cavity in a direction that is tangential to the centrifugal separator body wall; thereby the introduced gas and liquid mixture creates a swirling vortex flow path in the centrifugal separator cavity.

In some embodiments, the gas outlet is provided through a cover, in particularly through the centre of the cover. The gas outlet can protrude inwards through the cover. In some embodiments, the position of the gas outlet may be between a height of at least 80% to at most 120% of the height of the cylindrical section, in particularly between a height of at least 85% to at most 115% of the height of the cylindrical section, more in particular between a height of at least 90% to at most 110% of the height of the cylindrical section, even more in particular between a height of at least 95% to at most 105% of the height of the cylindrical section and most in particular between a height of at least 98% to at most 102% of the height of the cylindrical section, such as 100%. This may prevent a build-up of gas in the upper region of the centrifugal separator. It further may also prevent stagnant gas inside the centrifugal separator.

In some embodiments, the means for detecting is positioned in the upper half of the cylindrical section or in other words between a height of at least 50% to at most 100% of the height of the cylindrical section, in particularly between a height of at least 52% and 85% of height of the cylindrical section, more in particularly between a height of at least 55% and 75% of the height of the cylindrical section, even more in particularly between a height of at least 58% and 70% of the height of the cylindrical section and most in particularly between a height of at least 60% and 65% of the height of the cylindrical section.

In some embodiments, the means for detecting is positioned in the middle third of the cylindrical section, in particularly between a height of at least 33% to at most 67% of the height of the cylindrical section, more in particularly between a height of at least 40% to at most 65% of the height of the cylindrical section, even more in particular between a height of at least 50% to at most 63% of the height of the cylindrical section and most in particular between a height of at least 55% to at most 62% of the height of the cylindrical section.

In some embodiments, the means for detecting is positioned in the intersection of the upper half of the cylindrical section with the middle third of the cylindrical section, or in other words between a height of at least 50% to at most 67% of the height of the cylindrical section.

Often, these regions are more accessible, so that this makes installation and maintenance easier. Especially when the means for detecting comprise a radiation source, such region is higher from ground level, so that the radiation is not at the level of the core of the body of a bystander, which makes it safer for a bystander.

In some embodiments, the liquid outlet is provided at the tip of the conical section, in particularly along the central axis of the centrifugal separator. This prevents the build-up of liquid and/or the presence of stagnant liquid inside the centrifugal separator.

In some embodiments, the ratio of the height of the cylindrical section to the diameter of the cylindrical section is at least 1.0/1.0 to at most 5.0/1.0, in particularly at least 1.1/1.0 to at most 4.0/1.0, more in particular at least 1.2/1.0 to at most 3.0/1.0 even more in particular at least 1.3/1.0 to at most 2.5/1.0 and most in particular at least 1.4/1.0 to at most 2.2/1.0. This may increase the separation efficiency of the centrifugal separator.

In some embodiments, the ratio of the height of the cylindrical section to the height of the conical section is at least 1.0/1.0 to at most 4.5/1.0, in particular at least 1.5/1.0 to at most 4.0/1.0, more in particular at least 2.0/1.0 to at most 3.8/1.0 even more in particular at least 2.2/1.0 to at most 3.5/1.0 and most in particular at least 2.5/1.0 to at most 3.2/1.0. This may increase the separation efficiency of the centrifugal separator.

In some embodiments, the diameter of the cylindrical section is at least 0.2 m, in particular at least 0.4 m, more in particular at least 0.6 m, even more pin articular at least 0.8 m and most in particular at least 1.0 m.

In some embodiments, the diameter of the cylindrical section is at most 4.0 m, in particular at most 3.0 m, more in particular at most 2.0 m, even more in particular at most 1.8 m and most in particular at most 1.6 m.

In some embodiments, the diameter of the cylindrical section is at least 0.2 m to at most 4.0 m, in particular at least 0.4 m to at most 3.0 m, more in particular at least 0.6 m to at most 2.0 m, even more in particular at least 0.8 m to at most 1.8 m and most in particular at least 1.0 m to at most 1.6 m.

In some embodiments, the wall thickness of the cylindrical section is at least 1 mm to at most 50 mm, in particular at least 2 mm to at most 40 mm, more in particular at least 3 mm to at most 30 mm, even more in particular at least 4 mm to at most 20 mm and most in particular at least 5 mm to at most 10 mm, such as at least 6 mm to at most 10 mm.

In some embodiments, the opening angle of the conical section is at least 45°, in particular at least 50°, more in particular at least 55°, even more in particular at least 60° and most in particular at least 63°. This may increase the separation efficiency of the centrifugal separator.

In some embodiments, the opening angle of the conical section is at most 90°, in particular at most 85°, more in particular at most 80°, even more in particular at most 75° and most in particular at most 73°. This may increase the separation efficiency of the centrifugal separator.

In some embodiments, the opening angle of the conical section is at least 45° to at most 90°, in particular at least 50° to at most 85°, more in particular at least 55° to at most 80°, even more in particular at least 60° to at most 75° and most in particular at least 63° to at most 73°. This may increase the separation efficiency of the centrifugal separator.

In some embodiments, is the opening angle of the conical section two times the half angle, the half angle being the angle between the conical section and the central axis.

In some embodiments, the liquid-gas mixture inlet orifice is provide in the bottom half of the cylindrical section or between a height of at least 0% to at most 50% of the height of the cylindrical section, in particular between a height of at least 10% to at most 45% of the height of the cylindrical section, more in particular between a height of at least 20% to at most 43% of the height of the cylindrical section, even more in particular between a height of at least 27% to at most 40% of the height of the cylindrical section and most in particular between a height of at least 30% to at most 37% of the height of the cylindrical section. Such position of the liquid-gas mixture inlet orifice makes the centrifugal separator particularly suitable for the separation of liquid-gas mixtures.

In some embodiments, the liquid-gas mixture inlet orifice is positioned in the lower third of the cylindrical section or between a height of 0% to 33% of the height of the cylindrical section. This may increase the separation efficiency of the centrifugal separator.

In some embodiments, the ratio between the height of the position of the means for detecting in the cylindrical section and the height of the liquid-gas mixture inlet orifice in the cylindrical section is at least 1.0/1.0, in particular at least 1.2/1.0, more in particular at least 1.3/1.0, even more in particular at least 1.4/1.0 and most in particular at least 1.6/1.0.

In some embodiments, the inlet of the liquid-gas mixture relative is tangential relative to vertical axis, but may be angled relative to a horizontal axis.

In some embodiments, the ratio between the height of the position of the means for detecting in the cylindrical section and the height of the liquid-gas mixture inlet orifice in the cylindrical section is at least 1.0/1.0 to at most 4.5/1.0, in particular at least 1.2/1.0 to at most 3.5/1.0, more in particular at least 1.3/1.0 to at most 2.5/1.0, even more in particular at least 1.4/1.0 to at most 3.5/1.0 and most in particular at least 1.6/1.0 to at most 2.0/1.0. Such ratios have an impact on the thickness of the liquid on the centrifugal separator body wall at the point(s) of measurement, so that the output signal of the means of detecting is highly responsible to flow fluctuations.

In some embodiments, the means for detecting is positioned at least 0 mm, in particular at least 50 mm, more in particular at least 100 mm, even more in particular at least 200 mm and most in particular at least 300 mm above the liquid-gas mixture inlet orifice.

In some embodiments, the liquid-gas mixture inlet orifice is provided tangential to the cylindrical section. This causes swirling of the liquid and/or gas in a spiral path inside the centrifugal separator. In some embodiments, the liquid-gas mixture inlet orifice is a slit or a plurality of slits. In particular is the one or more slits rectangular slits in the cylindrical section. In some embodiments, the slits are positioned at the same height. In some alternative embodiments, the slits are arranged at a descending height from one other, in particularly wherein the each slit is positioned at least 0 to at most 5% lower, in particular at least 1% to at most 4% lower, more in particular at least 2% to at most 3% than the neighbouring slit, wherein the % is expressed as % of the height of the cylindrical section. Whenever the inlet comprises one or more slits, the position of the liquid-gas mixture inlet orifice is defined by the middle point of the highest slit.

In some embodiments, the slits have a length of at least 10% to at most 50%, in particular at least 15% to at most 45%, more in particular at least 20 to at most 40%, even more in particular at least 25% to at most 37% and most in particular at least 30% to at most 33% of the total height of the cylindrical section.

In some embodiments, the liquid-gas mixture inlet orifice is connected to an inlet pipe, in particular does the inlet pipe have a diameter of at least 0.05 to at most 0.50, in particular at least 0.10 to at most 0.45, most in particular 0.15 to 0.40 times the diameter of the cylindrical section.

In some embodiments, the gas outlet is connected to a gas outlet pipe, in particular does the gas outlet pipe have a diameter of at least 0.25 to at most 0.50, in particular at least 0.30 to at most 0.45, most in particular 0.33 to 0.42 times the diameter of the cylindrical section.

In some embodiments, the liquid outlet is connected to a liquid outlet pipe, in particular does the liquid outlet pipe have a diameter of at least 0.07 to at most 0.30, in particular at least 0.10 to at most 0.25, most in particular 0.13 to 0.20 times the diameter of the cylindrical section.

In some embodiments, the means for detecting comprise a wave source and a wave detector, in particular an electromagnetic wave source and an electromagnetic wave detector. This has the advantage that the means for detecting can be placed outside the centrifugal separator cavity, and hence does not disturb the flow inside the centrifugal separator.

Unless otherwise specified, the term "waves" refers to the portion of waves that are emitted by the wave source and are detected by the wave detector. The wave source might be un-directional, however when referred to the waves or the wave beam, it is meant the waves heading towards the detector, even though the waves might be absorbed by the centrifugal separator, the liquid or gas inside the centrifugal separator. Similar understanding should be given to the terms "gamma-rays", "acoustic waves", "electromagnetic waves" and "X-rays", which are all kinds of waves.

In some embodiments, the wave source emits gamma-rays, beta radiation and/or alpha radiation, in particular the wave source emits gamma-rays.

In some embodiments, the wave source and wave detector are positioned at the same height.

In some embodiments, the waves cross the centrifugal separator body wall in the cylindrical section, in particular the waves cross the centrifugal separator body wall two times in the cylindrical section;

more in particular the waves cross the centrifugal separator body wall two times in the cylindrical section, both times above the liquid-gas mixture inlet orifice; and most in particular the waves cross the centrifugal separator body wall two times in the cylindrical section, both times above the liquid-gas mixture inlet orifice and below the gas outlet.

In some embodiments, the waves cross the cylindrical section under an angle of at least 45°, in particular an angle of at least 55°, more in particular an angle of at least 65°, even more in particular an angle of at least 75°, and most in particular under an angle of at least 85°.

In some embodiments, the waves cross the cylindrical section under an angle of at least 45° to at most 90°, in particular an angle of at least 55° to at most 90°, more in particular an angle of at least 65° to at most 90°, even more in particularly an angle of at least 75° to at most 90°, and most in particularly under an angle of at least 85° to at most 90°. This way, a measurement conducted by the means of detecting is a superposition of two measuring points, which may provide more information than just using one measuring point.

In some embodiments, the waves cross the central axis of the centrifugal separator.

In some embodiments, the waves cross the central axis of the centrifugal separator perpendicularly.

In some embodiments, the waves cross the central axis of the centrifugal separator and cross the cylindrical section at the same height or in other words under a 90° angle.

In some embodiments, the waves may be selected from the list comprising gamma-rays, acoustic waves, electromagnetic waves or X-rays.

As used herein, the term "gamma-rays" are electromagnetic radiation with a photon energy of at least 100 keV, in particular at least 120 keV, more in particular at least 150 keV, even more in particular at least 170 keV and most in particular at least 200 keV, in particular arising from radioactive decay of atomic nuclei.

As used herein, the term "X-rays" are electromagnetic radiation with a photon energy of at least 100 eV to at most 100 keV.

In some embodiments, the radioactivity of the gamma-ray source is at least 1 mCi, in particular at least 2 mCi, more in particular at least 5 mCi, even more in particular at least 10 mCi, yet even more in particular at least 50 mCi and most in particular at least 100 mCi.

In some embodiments, the radioactivity of the gamma-ray source is at most 1000 mCi, in particular at most 750 mCi, more in particular at most 500 mCi, even more in particular at most 250 mCi, yet even more in particular at most 200 mCi and most in particular at most 150 mCi.

In some embodiments, the radioactivity of the gamma-ray source is at least 1 mCi to at most 1000 mCi, in particular at least 2 mCi to at most 750 mCi, more in particular at least 5 mCi to at most 500 mCi, even more in particular at least 10 mCi to at most 250 mCi, yet even more in particular at least 50 mCi to at most 200 mCi and most in particular at least 100 mCi to at most 150 mCi.

The invention further provides in the use of a centrifugal separator according to an embodiment of the invention as separating means of a gas and liquid mixture, wherein the liquid comprises at least one nitrate salt.

The invention further provides in the use of a centrifugal separator according to an embodiment of the invention as separating means of a gas and liquid mixture, wherein the liquid has a salt concentration of at least 0 (non-salt solution i.e. water) to at most 1600 g/l, in particular of at least 10 g/l to at most 1200 g/l, more in particular of at least 100 g/l to at most 1000 g/l, even more in particular of at least 200 g/l to at most 800 g/l, and most in particular of at least 400 g/l to at most 600 g/l.

The invention further provides in the use of a centrifugal separator according to an embodiment of the invention as separating means of a gas and liquid mixture, wherein the liquid has a salt content of at least 0 (non-salt solution i.e. water) to at most 100 wt %, in particular of at least 10 wt % to at most 99 wt %, more in particular of at least 20 wt % to at most 90 wt %, even more in particular of at least 40 wt % to at most 80 wt %, and most in particular of at least 60 wt % to at most 70 wt %. The invention further provides in the use of a centrifugal separator according to an embodiment of the invention as separating means of a gas and liquid mixture, wherein the liquid has density of at least 0.001 kg/m$^3$ to at most 5000 kg/m$^3$, in particular at least 0.01 kg/m$^3$ to at most 4000 kg/m$^3$, more in particular at least 0.1 kg/m$^3$ to at most 3000 kg/m$^3$, even more in particular at least 1 kg/m$^3$ to at most 2500 kg/m$^3$, and most in particular at least 10 kg/m$^3$ to at most 2000 kg/m$^3$.

In some embodiments, the liquid comprises at least one nitrate salt, in particular is the nitrate salt selected from the list comprising calcium nitrate, ammonium nitrate, potassium nitrate or a mixture of two or more of these. In some embodiments, the liquid further comprises a phosphate salt.

In some embodiments, the inlet velocity of the gas and the liquid is at least 5 m/s, in particular at least 10 m/s, more in particularly at least 15 m/s, even in particularly at least 20 m/s and most in particularly at least 25 m/s, the inlet velocity, is the velocity the moment the liquid-gas mixture enters the separator.

In some embodiments, the inlet velocity of the gas and the liquid is at least 1 m/s to at most 100 m/s, in particular at least 10 m/s to at most 90 m/s, more in particular at least 15 m/s to at most 75 m/s, even more in particular at least 20 m/s to at most 50 m/s and most in particularly at least 25 m/s to at most 35 m/s.

In some embodiments, the pressure in the centrifugal separator is at least 0.00 bara, in particular at least 0.01 bara, more particular at least 0.10 bara, even more in particular at least 0.50 bar and most particular at least 0.90 bara, such as 1.00 bara.

The invention further provides a method for detecting the thickness of a liquid layer of a liquid moving along a substantially symmetrical spiral path within a centrifugal separator, the centrifugal separator comprising a centrifugal separator body having a centrifugal separator body wall, the centrifugal separator body comprising a cylindrical section and a conical section, a gas outlet positioned at the top end of the centrifugal separator body and a liquid outlet positioned at the bottom end of the centrifugal separator body, a liquid-gas mixture inlet orifice (8), in particular positioned in the cylindrical section (2) of the centrifugal separator body and further comprising means for detecting the thickness of the liquid on the centrifugal separator body wall positioned in the cylindrical section (2), wherein the method comprises the steps of:
a) providing a flow of liquid moving along a substantially symmetrical spiral path within the centrifugal separator;
b) monitoring the output signal of the means for detecting;
c) converting the output signal towards a liquid thickness.

In some embodiments of the method, the centrifugal separator is a centrifugal separator according to an embodiment of the invention.

The invention further provides a use of detection means positioned along a cylindrical section of a centrifugal separator, as a flow monitoring device in a centrifugal separator. In some embodiments of the use, the means for detecting are positioned between the liquid-gas mixture inlet orifice and the gas outlet of the centrifugal separator.

In some embodiments, the detected thickness of the liquid layer may be used in a control system to determine if a blockage to the flow has occurred in the centrifugal separator or further downstream.

A blockage will lead to disruption in the tangential velocity in the separator, causing a deterioration in the separation efficiency, which may cause liquid droplet being carried over in the gas stream. This may lead to increase in emissions from the plant and loss of product.

In some embodiments, the method will also allow for more sensitive control of the centrifugal separator compared to centrifugal separators with detection means at the bottom and will allow for faster detection of any problems with the separation efficiency. This is because the liquid film measured above the gas-liquid inlet is sensitive to the inlet mass flow load as well as the gas/liquid composition. These are constantly changing parameters in a continuously operating process plant.

In some embodiments, combining the liquid thickness measurement with valve opening data could give signs of erosion of a valve opening as the increase in diameter will lead to a reduction in the inlet velocity. The reduction in the inlet velocity will lead to a reduction in the tangential rotational speed and so a reduction in the liquid thickness on the wall. If the valve position stays constant and there is a drop in the liquid film thickness over time it will be an indication that there is something wrong with the valve orifice size. This may be a trigger for predictive maintenance on an inlet valve on the inlet pipe to the centrifugal separator.

The invention will be more readily understood by reference to the following examples, which are included merely for purpose of illustration of certain aspects and embodiments of the present invention and are not intended to limit the invention.

EXAMPLES

Example 1

Figure 1B:
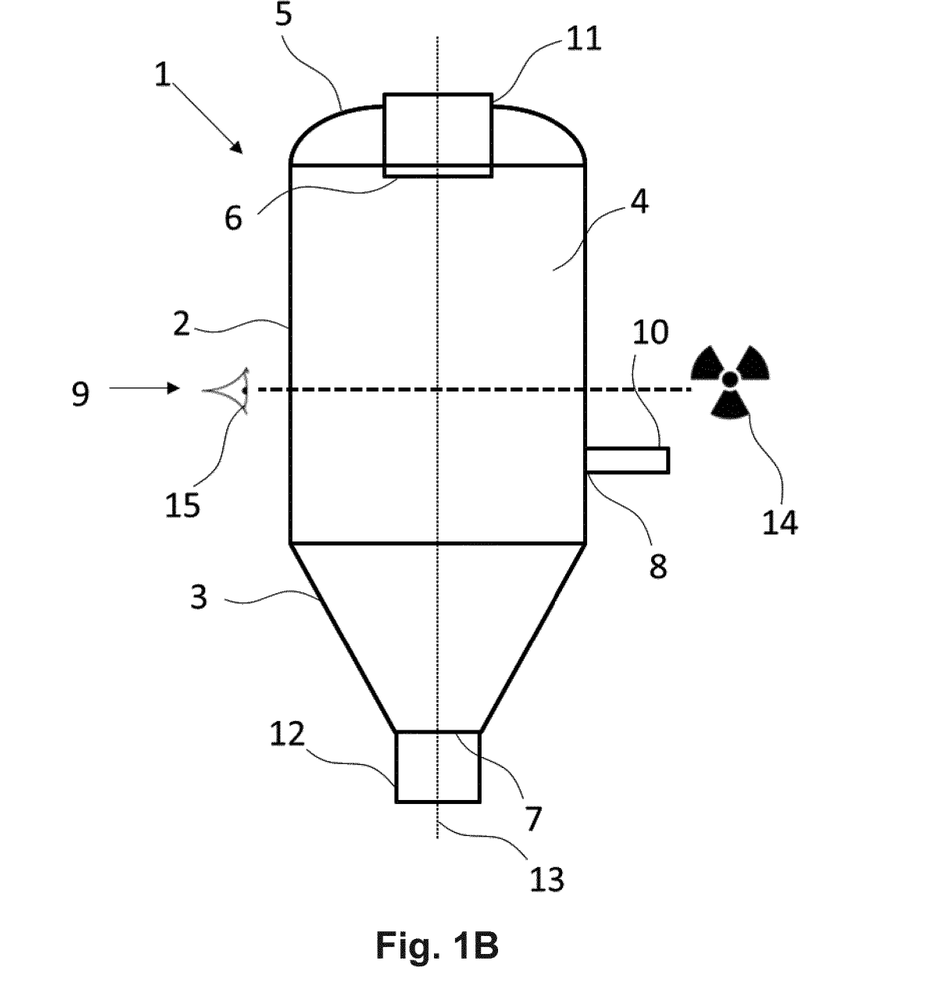
FIG. 1B represents centrifugal separator according to an embodiment of the invention.

FIG. 1B represents a centrifugal separator 1, the centrifugal separator comprises a cylindrical section 2 and a conical section 3, together encasing an centrifugal separator cavity 4, which is symmetrical around a central axis 13. The cylindrical section 2 is closed off at the upper side with a cover 5, where through a gas outlet 6 is placed, connected to a gas outlet pipe 11. At the bottom of the conical section 3 a liquid outlet 7 is present, connected to a liquid outlet pipe 12. A liquid-gas mixture inlet orifice 8 is in fluidly connection with the centrifugal separator cavity 4 through the cylindrical section 2. The liquid-gas mixture inlet orifice 8 is connected to inlet pipe 10. Means for detecting 9 are provided, along the cylindrical section 2. The means of detecting 9 comprise a gamma-ray source 14 and a gamma-ray detector 15.

Example 2

In FIG. 2, a comparison is made between four centrifugal separators:
  centrifugal separator A-PA: a centrifugal separator where the detecting means are placed along the conical section;
  centrifugal separator A-INV: a centrifugal separator identical to centrifugal separator A-PA apart from the position of the means of detecting, and therefore is centrifugal separator A-INV a centrifugal separator according to the invention;
  centrifugal separator B-PA: a centrifugal separator where the detecting means are placed along the conical section;
  centrifugal separator B-INV: a centrifugal separator identical to centrifugal separator B-PA apart from the position of the means of detecting, and therefore is centrifugal separator B-INV a centrifugal separator according to the invention.

Centrifugal separators A-PA and A-INV have the following characteristics and operate at the following conditions:
The internal diameter of the cylindrical section 2 is 1.10 m, the height of the cylindrical section 2 is 2.0 m. the opening angle of the conical section 7 is 63°. The internal diameter of the liquid-gas mixture inlet orifice pipe 10 is 0.492 m. The gas outlet 6 has an internal diameter of 0.488 m, which is in fluidly connection with a gas outlet pipe 11, with the same internal diameter. The internal diameter of the liquid outlet 7 is 0.211 m, which is in fluidly connection with a liquid outlet pipe 12 with the same internal diameter. The liquid-gas mixture inlet orifice 8 comprises 1 slit with a length of 0.712 m and a width of 0.26 m, and is fluidly connected with the surface of the cylindrical section 2. The centre of the inlet pipe 10, which is also the centre of the inlet slit, is placed at a height corresponding to 37% of the height of the cylindrical section. The thickness of the conical section 3 and the cylindrical section 2 was 12 mm.

On average, the gas inlet flow was 5.75 m³/s, the liquid inlet flow was 24.5 kg/s at an inlet velocity of 31.1 m/s.

Specifically for centrifugal separator A-PA: a 100 mCi gamma-ray source 14 and a gamma ray detector 15 were placed along the conical section 3, so that the beam of detectable gamma-rays cross the central axis 13 of the centrifugal separator under a 90° angle, and that the beam of detectable gamma-rays crosses the centrifugal separator 162 mm above the liquid outlet, or around a 27% of the height of the conical section 3.

Specifically for centrifugal separator A-INV: a 100 mCi gamma-ray source 14 and a gamma ray detector 15 were placed along the cylindrical section 3, so that the beam of detectable gamma-rays cross the central axis 13 of the centrifugal separator under a 90° angle, and that the beam of detectable gamma-rays crosses the centrifugal separator 300 mm above the liquid-gas mixture inlet orifice 8, or around a 60% of the height of the cylindrical section 3.

Centrifugal separators B-PA and B-INV have the following characteristics and operates at the following conditions:
The internal diameter of the cylindrical section 2 is 1.52 m, the height of the cylindrical section is 1.66 cm. the opening angle of the conical section 7 is 73.2°. The internal diameter of the liquid-gas mixture inlet orifice pipe 10 is 0.240 m. The gas outlet 6 has an internal diameter of 0.488 m, which is in fluidly connection with a gas outlet pipe 11, with the same internal diameter. The internal diameter of the liquid outlet is 0.23 m, which is in fluidly connection with a liquid outlet pipe with the same internal diameter 12. The liquid-gas mixture inlet orifice comprises 1 slit with a length of 0.700 m and a width of 0.16 m. The centre of the inlet pipe 10, which is also the centre of the inlet slit, is placed at a height corresponding to 30% of the height of the cylindrical section. The thickness of the conical section 3 was 8 mm and the cylindrical section 2 was 12 mm. On average, the gas inlet flow was 3.125 m³/s, the liquid inlet flow was 23 kg/s at an inlet velocity of 28 m/s.

Specifically for centrifugal separator B-PA: a 100 mCi gamma-ray source 14 and a gamma ray detector 15 were placed along the conical section 3, so that the beam of detectable gamma-rays cross the central axis 13 of the centrifugal separator under a 90° angle, and that the beam of detectable gamma-rays crosses the centrifugal separator 165 mm above the liquid outlet, or around a 22% of the height of the conical section 203.

Specifically for centrifugal separator B-INV: a 100 mCi gamma-ray source 14 and a gamma ray detector 15 were placed along the cylindrical section 3, so that the beam of detectable gamma-rays cross the central axis 13 of the centrifugal separator under a 90° angle, and that the beam of detectable gamma-rays crosses the centrifugal separator 300 mm above the liquid-gas mixture inlet orifice 8, or around a 60% of the height of the cylindrical section 3.

Figure 2A:
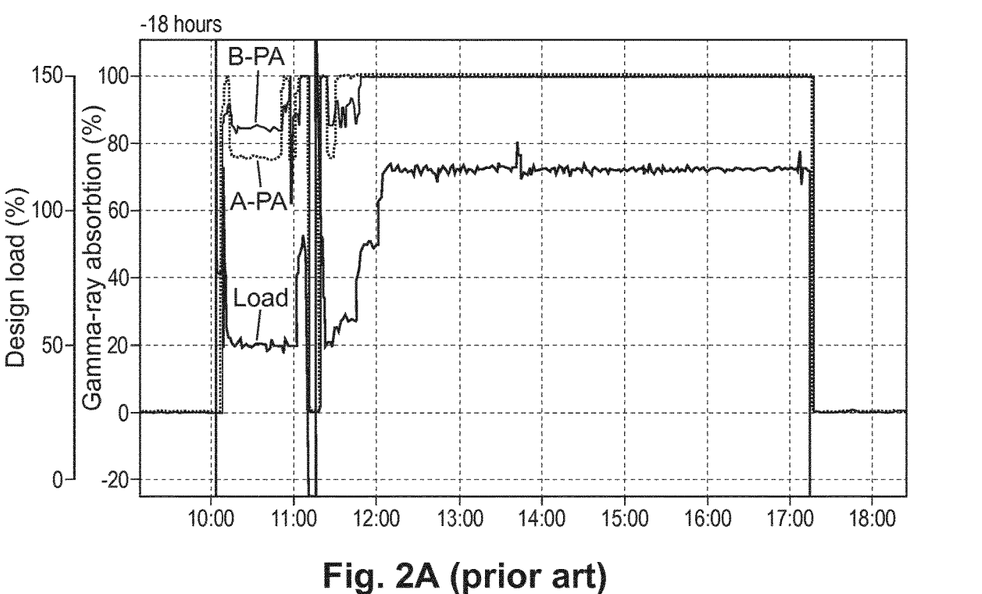
FIG. 2 provides a comparison between the output signal of the gamma-ray detector of centrifugal separators where the detecting means are placed along the conical section (FIG. 2a) and the output signals of centrifugal separators according to embodiments of the invention (FIG. 2b).
Figure 2B:
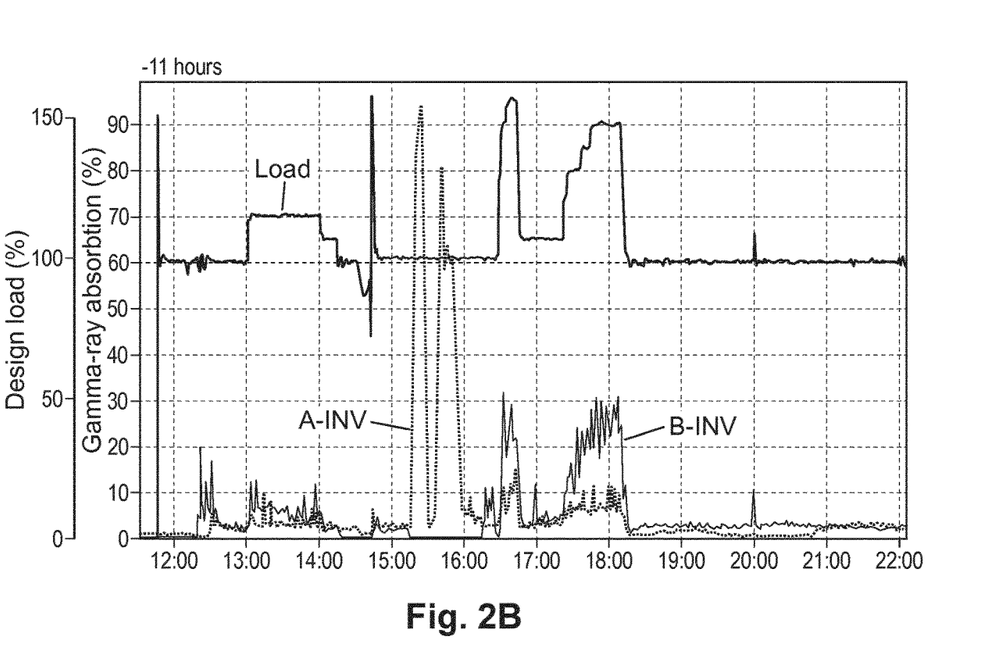

FIG. 2 compares the output signal (absorption of gamma-rays, expressed in %) of the detectors in the centrifugal separator A-PA (in FIG. 2a) and the centrifugal separator B-PA (in FIG. 2a), in function of time and the load (in FIG. 2a); with the output signal (absorption of gamma-rays, expressed in %) of the detector in the centrifugal separator A-INV (in FIG. 2b) and the detector in the centrifugal separator B-INV (in FIG. 2b), in function of time and the load (in FIG. 2b).

In FIG. 2a, it can be seen that the detector signal completely disappears before the load in the centrifugal separator is about 60 m³/h, which is 100% of the design load. At this point no information can be obtained anymore from the cyclone. It has been noticed that the detector signal disappears around a liquid thickness of 10 cm.

In FIG. 2b, when the load in the centrifugal separator is around 60 m³/h, the detectors are still responsive to changes in the load, for example, for loads around 90 m³/h, which is 150% of the design load, see ±18.00, the detector signals are still below 27% absorption corresponding to 13 mm liquid thickness.

It is noticed that a weaker gamma ray source could be used in the examples of the invention, which would still provide an adequate response.

Example 3

Figure 3:
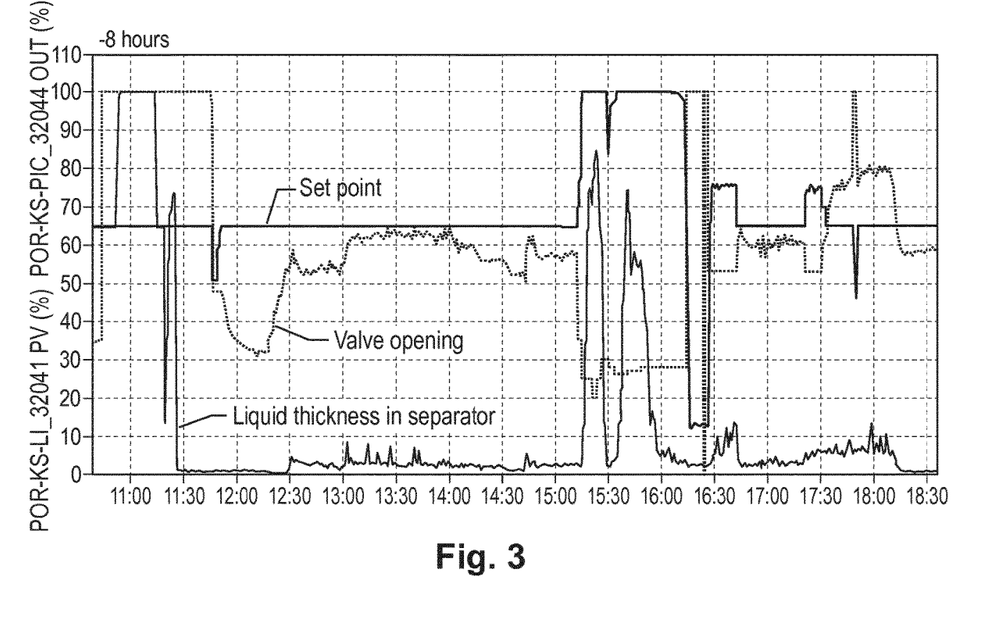
FIG. 3 provides output signals of centrifugal separators according to the invention.

FIG. 3 shows the effect of the reduction of the inlet flowrate when the flow rate is reduced by closing of a valve opening over a period of time, upstream from the centrifugal separator. The dimensions of the separator are 1.5 m diameter in the upper section, bottom cone height 0.9 m. Total separator height 2.75 m, Inlet area 0.112 m², top outlet diameter 0.5 m and bottom outlet diameter 0.25 m. The detector is placed above the inlet.

The liquid film thickness (lower line) on the wall follows the trend of the opening and closing the valve opening (middle line). The upper line represents the set point at each moment in time.

By correlating the wall thickness as a function of the position of the valve, valve erosion can be determined when the values start to differ from those correlated data. Such setup can be used for predictive maintenance on the inlet valves.

REFERENCE SIGNS

| | REFERENCE SIGNS |
|---|---|
| 1 | centrifugal separator |
| 2 | cylindrical section |
| 3 | conical section |
| 4 | centrifugal separator cavity |
| 5 | cover |
| 6 | gas outlet |
| 7 | liquid outlet |
| 8 | liquid-gas mixture inlet orifice |
| 9 | means of detecting |
| 10 | gas and inlet pipe |
| 11 | gas outlet pipe |
| 12 | liquid outlet pipe |
| 13 | central axis |
| 14 | gamma-ray source |
| 15 | gamma-ray detector |

The invention claimed is:

1. A centrifugal separator for industrial separation of a liquid-gas mixture, comprising:
a centrifugal separator body having a centrifugal separator body wall, the centrifugal separator body comprising a cylindrical section positioned vertically above a conical section;
a gas outlet positioned at a top end of the cylindrical section of the centrifugal separator body;
a liquid outlet positioned at a bottom end of the conical section of the centrifugal separator body; and
a liquid-gas mixture inlet orifice extending through the centrifugal separator body wall in the cylindrical section of the centrifugal separator body, the liquid-gas mixture inlet orifice being spaced apart from and below the gas outlet,
wherein the centrifugal separator body further comprises means for detecting a thickness of the liquid on the centrifugal separator body wall, wherein the means for detecting the thickness of the liquid are positioned in the cylindrical section between the gas outlet and the liquid-gas mixture inlet orifice.

2. The centrifugal separator according to claim 1, wherein the means for detecting is positioned in an upper half of the cylindrical section.

3. The centrifugal separator according to claim 1, wherein the means for detecting is positioned between a height of at least 50% to at most 67% of the height of the cylindrical section.

4. The centrifugal separator according to claim 1, wherein the liquid-gas mixture inlet orifice is provided in a bottom half of the cylindrical section.

5. The centrifugal separator according to claim 1, wherein the centrifugal separator separates a gas and liquid mixture, wherein the liquid comprises at least one nitrate salt.

6. The centrifugal separator according to claim 1, wherein the centrifugal separator separates a gas and liquid mixture, wherein the liquid has a salt concentration of at least 0 to at most 1600 g/l.

7. The centrifugal separator according to claim 1, wherein the centrifugal separator separates a gas and liquid mixture, wherein the liquid has density of at least 10 kg/m³ to at most 2000 kg/m³.

8. The centrifugal separator according to claim 1, wherein a ratio between a height of the position of the means for detecting in the cylindrical section and a height of the liquid-gas mixture inlet orifice in the cylindrical section is greater than 1.0/1.0.

9. The centrifugal separator according to claim 8, wherein the ratio is at least 1.3/1.0.

10. The centrifugal separator according to claim 8, wherein the ratio is at least 1.6/1.0.

11. The centrifugal separator according to claim 1, wherein the means for detecting comprises a wave source and a wave detector.

12. The centrifugal separator according to claim 11, wherein the wave source emits gamma-rays.

13. The centrifugal separator according to claim 11, wherein the wave source and the wave detector are positioned at a same height.

14. The centrifugal separator according to claim 11, wherein the wave source is an electromagnetic wave source and the wave detector is an electromagnetic wave detector.

15. A method for detecting a thickness of a liquid layer of a liquid moving along a symmetrical spiral path within a centrifugal separator, the centrifugal separator comprising a centrifugal separator body having a centrifugal separator body wall, the centrifugal separator body comprising a cylindrical section positioned vertically above a conical section, a gas outlet positioned at a top end of the cylindrical section of the centrifugal separator body and a liquid outlet positioned at a bottom end of the conical section of the centrifugal separator body, a liquid-gas mixture inlet orifice extending through the centrifugal separator body wall in the cylindrical section of the centrifugal separator body, the liquid-gas mixture inlet orifice being spaced apart from and below the gas outlet, wherein the centrifugal separator body further comprises means for detecting the thickness of the liquid on the centrifugal separator body wall, said means for detecting being positioned in the cylindrical section between the gas outlet and the liquid-gas mixture inlet orifice, wherein the method comprises steps of:
- a) providing a flow of the liquid moving along a symmetrical spiral path within the centrifugal separator;
- b) monitoring an output signal of the means for detecting;
- c) converting the output signal to a liquid thickness.

16. The method of claim 15, wherein the centrifugal separator is a centrifugal separator according to claim 1.

17. The method according to claim 15, wherein the liquid comprises at least one nitrate salt.

18. The method according to claim 15, wherein the liquid has a salt concentration of at least 0 to at most 1600 g/l.

19. The method according to claim 15, wherein the liquid has density of at least 10 kg/m$^3$ to at most 2000 kg/m$^3$.

* * * * *